United States Patent Office 3,651,011
Patented Mar. 21, 1972

3,651,011
CYCLIZATION OF 1,2-POLYBUTADIENE IN THE PRESENCE OF PHENOLIC ANTIOXIDANTS
Robert J. Schaffhauser, Brookside, and Chester L. Parris, Morris Plains, N.J., assignors to Allied Chemical Corporation, New York, N.Y.
No Drawing. Filed June 11, 1969, Ser. No. 832,488
Int. Cl. C08f 27/00
U.S. Cl. 260—45.95
4 Claims

ABSTRACT OF THE DISCLOSURE 1,2-polybutadiene is cyclized within 10 hours to the point of complete elimination of vinyl unsaturation, at concentration in lower alkyl benzene in the range 3%–10% by weight, using a cationic agent, especially boron trifluoride, to promote the cyclization. The temperature employed is at most 105° C. An antioxidant such as a hindered polyphenol is included in the cyclization reaction mixture.

BACKGROUND OF THE INVENTION

This invention relates to isomerization of 1,2-polybutadiene having at least about 60% of its butadiene content combined in the 1,2 form. The subject isomerization when carried to its maximum, results in virtually complete elimination of vinyl groups from the polymer at least when the polymer has a high content of vinyl groups as in polymer having 90% or more of its butadiene content combined in the 1,2 form. The resulting polymers have a high level of stiffness and resistance to heat. The isomerized polymers obtained by the process of this invention, moreover, show about the same number average molecular weight, determined by osmometry, as the starting polymers; they are fully soluble in toluene; and they have greater melt viscosities than the starting polymers. Accordingly the isomerized polymers obtained by this invention are believed to be cyclized 1,2-polybutadiene having as the chain structure, a chain of fused cyclohexane rings.

Cyclization of polybutadiene polymers containing pendant doubly bonded groups has been known for many years. However, the known cyclization procedures for 1,2-polybutadiene generally resulted in cross-linking, making the polymer product insoluble in the usual aromatic hydrocarbon solvents such as benzene and toluene.

To avoid cross-linking, in accordance with one proposal, polybutadienes having pendant doubly bonded groups are cylized, with the use of a cationic agent to promote the cyclization, at low concentration of polymer in benzene or a lower alkyl benzene solvent such as toluene (U.S. Pat. 3,245,974 of Apr. 12, 1966 to Angelo). The maximum concentration of polymer in the solvent, permissable in this patented procedure, is 1%. Such low concentration is undesirable economically because of the large volumes of solvent which must be handled and recovered. Specifically this patent teaches cyclization only of 3,4-polyisoprene and other substituted polybutadienes.

Unsubstituted 1,2-polybutadiene polymers having at least 60% and up to substantially 100% of the butadiene content combined in the 1,2 form are known in the art, e.g. from Montecatini British Pats. 835,752 published May 25, 1960; and 854,615 published Nov. 23, 1960. The 1,2-polybutadiene content of such polymers is determined from infrared spectral data as known in the art.

SUMMARY

By this invention an improved process is provided for cyclization of 1,2-polybutadiene having at least 60% of its butadiene content combined in the 1,2 form, using a cationic agent to promote the cyclization and using a lower alkyl benzene solvent as reaction medium. By the process of the invention, concentrations of the polymer in the solvent of about 5% by weight can readily be used. In accordance with this invention, the temperature employed during the cyclization reaction is limited to at most 105° C. and there is included in the 1,2-polybutadiene undergoing cyclization, an antioxidant such as a hindered polyphenol or other phenolic or aromatic amine antioxidant in proportion of at least 0.1% by weight on the polybutadiene. The concentration of polymer in solvent is in the range 3%–10% by weight. Thereby within 10 hours of reaction time, upon precipitation from the solvent, a polymer product is obtained which is free of vinyl groups as indicated by infrared spectrum and is free of cross-linking as shown by its ready solubility in toluene at 25° C. At times short of giving maximum cyclization, polymers having progressively higher second order transition temperatures (as determined by stiffness measurements) are obtained, indicating that the structure is a chain of fused cyclohexane ring segments joined by 1,2-polybutadiene segments in these polymers.

PREFERRED EMBODIMENTS OF THE INVENTION

To obtain the maximum benefits of this invention, it is desirable to use 1,2-polybutadiene starting polymer having a high concentration of pendant vinyl groups, i.e. having at least 90% of its butadiene content combined in the 1,2 form. Particular varieties of such high vinyl polybutadiene are the known syndiotactic polymers and atactic polymers.

A particularly useful cationic agent for the purposes of this invention is boron trifluoride, suitably in the form of its complex with diethyl ether, known as boron trifluoride etherate. A concentration of at least 0.1% by weight as boron trifluoride should be employed in the reaction mixture; and preferably the agent is supplied in such concentration at intervals throughout the reaction period.

A preferred solvent in view of its suitable boiling point and ready availability is toluene; also the various xylene isomers are suitable and also ethyl benzene. As stated above, the reaction temperature should not exceed 105° C., since if higher temperatures are used for appreciable periods, cross-linking of the polymer is likely. Too high a concentration of the polymer will also allow cross-linking, so that 10% by weight is considered a maximum.

In order to obtain a satisfactorily rapid reaction the reaction temperature will in general be maintained at least at 90° C. To obtain the advantages of the invention in terms of using reduced volumes of solvent, the concentrations of polymer employed will ordinarily be at least 3% by weight.

In addition to temperature control, a very important feature of the invention is to include in the polybutadiene undergoing cyclization, an antioxidant capable of inhibiting cross-linking. Hindered polyphenol antioxidants are very suitable, such as bisphenols, trisphenols, etc. for example the 4,4'-bis-(tertiary-butyl-meta-cresols); and also antioxidants based on aromatic amines. The effectiveness of antioxidants to inhibit cross-linking has been disclosed in the prior art. However it was quite unexpected that these materials would allow cyclization to proceed while effectively inhibiting cross-linking. In fact, in the prior art such antioxidants, when present in the starting polymer, have been removed e.g. by washing with acetone.

To be effective, the antioxidant should be employed in amount of at least 0.1% by weight. Larger amounts can be used, but in general the amount used will not exceed about 10% by weight.

EXAMPLES

The examples which follow are illustrative of the invention and the best mode contemplated at present for carrying out the invention; but the invention is not to be considered as limited to all details of the examples.

(A) Definitions and tests (1) Molecular weight, M, is determined from intrinsic viscosity, $\eta$, in toluene at 25° C. by the formula:

$$\eta = 1.53 \times 10^{-4} M^{0.8}$$

where the units of $\eta$ are dl./gm. (see "Ind. Eng. Chem." Vol. 44 of 1952, pages 752–756—article by Bernard L. Johnson and R. D. Wolfangel).

(2) Physical properties were measured on compression molded test bars using the following ASTM test methods:

(a) Flexural properties _____ D–790
(b) Tensile properties _____ D–638
(c) Izod impact _____ D–256

The samples were compressed to a preform, then heated in the press for 2 minutes at 180° C., then pressurized 6 minutes at 220° C.; then cooled.

(3) $T_i$ is a measure of stiffness in relation to temperature, given by the temperature at which torsional modulus (Gehman method) has the value: $3.33 \times 10^8$ dynes per sq. cm.

(B) Starting polymers (1) Syndiotactic 1,2-polybutadiene having molecular weight of about 80,000 was prepared generally in accordance with the following procedure:

A three neck flask equipped with a magnetic stirrer is purged free of air with dry nitrogen. To the flask is added 1.5 g. (0.0042 mole) of cobaltic acetylacetonate, followed by 2 ml. of butadiene liquefied at 0° C. To the catalyst is added 100 ml. of benzene. The mixture is stirred and maintained at a temperature of about 10° C.; whereupon 1.5 g. (0.0130 mole) of aluminum triethyl is added. After stirring for 30 minutes the contents of the flask are transferred under a purge of nitrogen to a loading device for attachment and charging to the reactor.

A second loader is charged with 2095 g. of butadiene and 2 ml. (0.0122 mole) of diethyl fumarate. Both loaders are attached to a clean dry one gallon glass lined autoclave which has been purged with nitrogen for 15 minutes. To the reactor is added 525 g. of butadiene. Stirring is started and cooling water is circulated around the reactor jacket until the temperature is about 10° C. The pressure is approximately 30 p.s.i.g. The catalyst solution is added by gravity from the other loader to the reactor. After 15 minutes, an additional 525 g. of butadiene is fed to the reactor. Addition is continued at 15 minute intervals until all the monomer has been added. The reaction is continued so that the total time is 4 hours.

At the end of this period the product is discharged through the bottom of the reactor into a second vessel equipped with a vent line for unreacted monomer. This vessel contains 2 liters of isopropyl alcohol and 50 ml. of hydrochloric acid. A nitrogen purge is attached to the reactor to pass through the bottom discharge line below the surface of the liquid in the lower vessel. The purge is conducted for 15 minutes. The product is filtered from the deactivation medium and transferred to a blender (Waring) containing 1.5 liters of isopropyl alcohol and 3.4 g. of a commercial hindered polyphenol antioxidant ("Irganox" 1076). The resin is blended for 15 minutes and filtered. It is transferred to trays and dried in a vacuum oven at 50° C. for 6 hours. There is obtained 680 g. of a white, granular polymer product having at least 90% of the butadiene content combined in the 1,2 form as indicated by infrared spectral data.

(2) Commercially available amorphous atactic 1,2-polybutadiene polymers having at least 90% of their butadiene content combined in the 1,2 form as indicated by infrared spectrum, having molecular weights of about 200,000–900,000.

(C) Cyclization procedure

Polymer was cyclized in 5% toluene solution at 100° C. After purging 3500 ml. of solution with dry nitrogen, 8.5 ml. of 98% boron trifluoride ether complex (Matheson, Coleman and Bell) were added. The solution turned from clear to dark brown on addition of the $BF_3$ and the reaction proceeded smoothly. Additional 8.5 ml. portions of catalyst were added at ½ hour intervals for the first three hours and at one hour intervals thereafter. After six hours, the reaction was terminated by adding the solution dropwise into a rapidly stirred methanol-ammonia solution to which a small amount (~0.1%) of hindered polyphenol antioxidant had been added. The precipitated polymer was dissolved in chloroform, re-precipitated in methanol (plus antioxidant) and dried under vacuum. The polymer obtained was a light yellow solid, which was soluble in hydrocarbon solvents at room temperature. Its infrared spectrum gave no evidence of residual vinyl unsaturation.

Polymer properties are shown in the Tables I–III below.

TABLE I.—RESULTS OF THERMAL AGING OF CYCLIZED SYNDIOTACTIC 1,2-POLYBUTADIENE IN AIR AT 200° C.

|  | Weight loss (percent) | Flexural Strength (p.s.i.) | Flexural Modulus (p.s.i.) |
|---|---|---|---|
| Exposure time (hrs.): |  |  |  |
| 0 |  | 2,484 | $4.4 \times 10^5$ |
| 24 |  | 3,404 | $4.2 \times 10^5$ |
| 168 | 1.8 | 2,870 | $1.7 \times 10^5$ |
| 500 |  | 3,730 | $1.7 \times 10^5$ |
| 672 | 2.5 | (6,256) | $4.6 \times 10^5$ |

TABLE II.—RELATIONSHIP BETWEEN CYCLIZATION REACTION TIME, POLYMER TRANSITION TEMPERATURE $T_i$, AND EXTENT OF CYCLIZATION (ESTIMATED FROM $T_i$) OF CYCLIZED SYNDIOTACTIC 1,2-POLYBUTADIENE

|  | $T_i$ (° C.) | Extent of cyclization |
|---|---|---|
| Reaction time (hrs.): |  |  |
| 6 | 212 | Complete. |
| 3 | 174 | Ca 90%. |
| 1.5 | 88 | Ca 60%. |
| 2 (80° C.) | 26 | Ca 30%. |

TABLE III.—PHYSICAL PROPERTIES OF CYCLIZED 1,2-POLYBUTADIENE [1]

| Molecular weight of starting polymer | Flexural Strength (p.s.i.) | Flexural Modulus (p.s.i.) | Tensile Strength (p.s.i.) | Tensile Modulus (p.s.i.) | Elongation (percent) | Impact (Izod) (ft.-lb./in.) |
|---|---|---|---|---|---|---|
| Syndiotactic: |  |  |  |  |  |  |
| 80,000 | 2,690 | $4.3 \times 10^5$ |  |  |  | 0.2 |
| Atactic: |  |  |  |  |  |  |
| 200,000 | 2,048 | $4.2 \times 10^5$ | 1,030 | $3.8 \times 10^5$ | 0.3 | 0.2 |
| 500,000 | 2,687 | $4.1 \times 10^5$ |  |  |  |  |
| 900,000 | 2,046 | $4.4 \times 10^5$ |  |  |  |  |
| 200,000 [2] | 1,919 | $3.2 \times 10^5$ | 1,387 |  |  |  |

[1] Samples contained 20% asbestos (anthophyllite).
[2] Sample measured at 150° C.

The subject polymers are thermoplastics having heat distortion temperature of about 170°–190° C., having good retention of properties at elevated temperatures, and having ready solubility in common solvents such as benzene and toluene. As such they are useful in compression molding and coating applications. Fillers can be used, e.g. to provide reinforcement. Best high temperature properties are provided by fully cyclized polymer. The partially cyclized polymers have progressively higher heat distortion temperatures as cyclization increases. They are more flexible than fully cyclized polymer and are easier to process.

What is claimed is:

1. Improved process for cyclization of 1,2-polybutadiene having at least 60% of its butadiene content combined in the 1,2 form, using a cationic agent as cyclization promoter and a lower alkyl benzene solvent as reaction medium, wherein the improvement comprises including in the reaction medium an antioxidant in proportions of at least 0.1% by weight based on the polybutadiene and not above 10% by weight; employing concentration of polybutadiene in the solvent in the range between 3% and 10% by weight; and maintaining temperatures of the reaction mixture not above 105° C. whereby within 10 hours of reaction time, upon precipitation from the solvent, a polymer product is obtained which is free of vinyl groups as indicated by infrared spectrum and is soluble in toluene at 25° C.

2. Improved process for cyclization of 1,2-polybutadiene having at least 90% of its butadiene content combined in 1,2 form, using boron trifluoride as cyclization promoter and a lower alkyl benzene solvent as reaction medium, wherein the improvement comprises including in the reaction medium a hindered polyphenol as antioxidant in proportions of at least 0.1% by weight based on the polybutadiene and not above 10% by weight; employing concentration of polybutadiene in the solvent in the range between 3% and 10% by weight; and maintaining temperatures of the reaction mixture not above 105° C. whereby within 10 hours of reaction time, upon precipitation from the solvent, a polymer product is obtained which is free of vinyl groups as indicated by infrared spectrum and is soluble in toluene at 25° C.

3. Process of claim 2 wherein the polybutadiene is syndiotactic 1,2-polybutadiene.

4. Process of claim 2 wherein the polybutadiene is atactic 1,2-polybutadiene.

References Cited

UNITED STATES PATENTS

| | | | |
|---|---|---|---|
| 3,239,484 | 3/1966 | Stark | 260—45.95 |
| 3,245,974 | 4/1966 | Angelo | 260—94.2 |
| 3,251,801 | 5/1966 | Boag | 260—45.95 |
| 3,393,176 | 7/1968 | Vervloet | 260—94.7 |
| 3,485,795 | 12/1969 | Gilles | 260—45.95 |
| 3,502,629 | 3/1970 | Matthews. | |

MAURICE J. WELSH, Primary Examiner

E. C. RZUCIDLO, Assistant Examiner

U.S. Cl. X.R.

260—33.6 UA, 94.2 R, 94.7 R, 94.7 HA